Dec. 23, 1930. C. H. IWANOWITZ 1,785,775
AIRCRAFT
Filed March 5, 1929  2 Sheets-Sheet 1
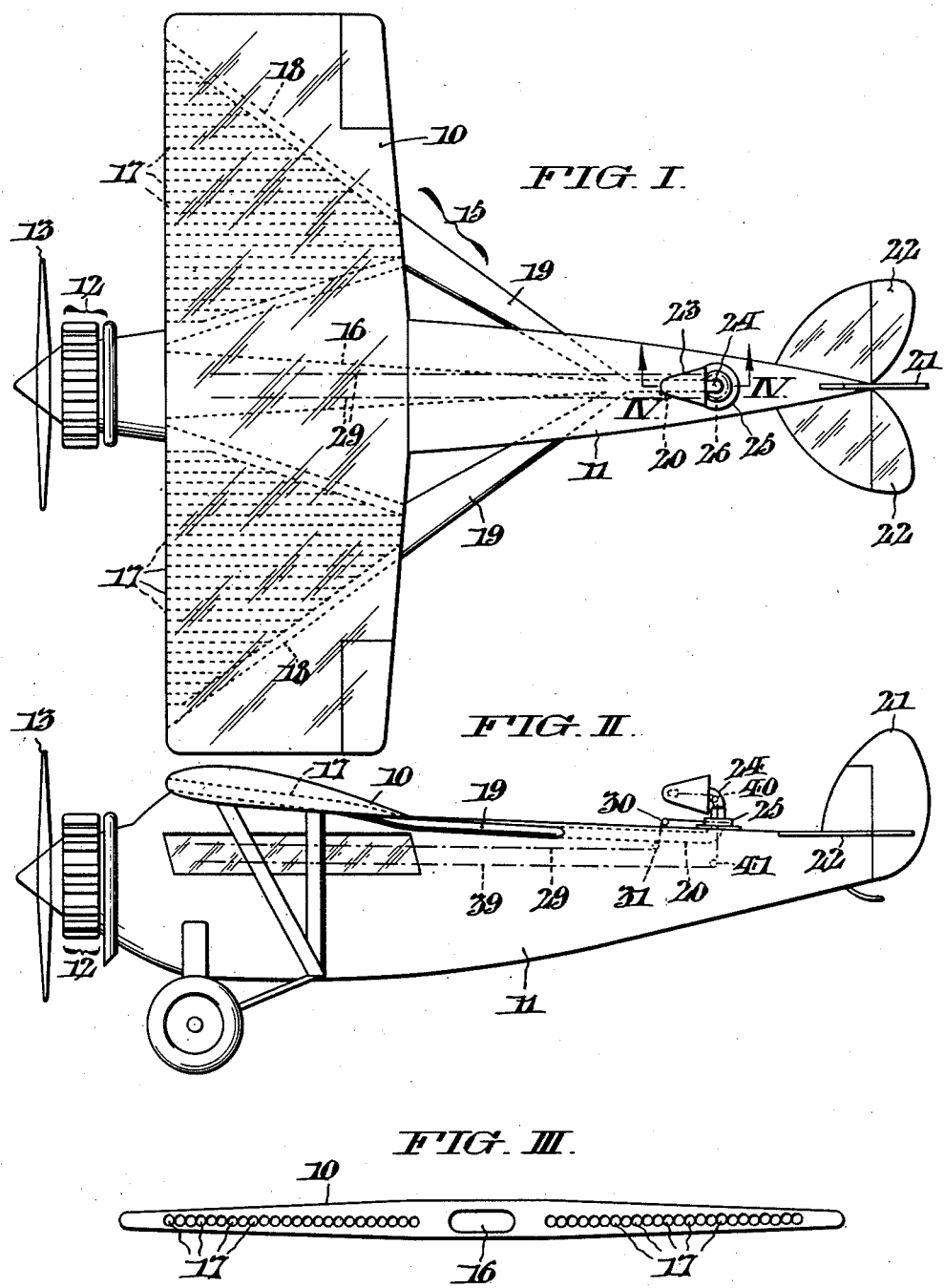

Dec. 23, 1930. C. H. IWANOWITZ 1,785,775
AIRCRAFT
Filed March 5, 1929  2 Sheets-Sheet 2
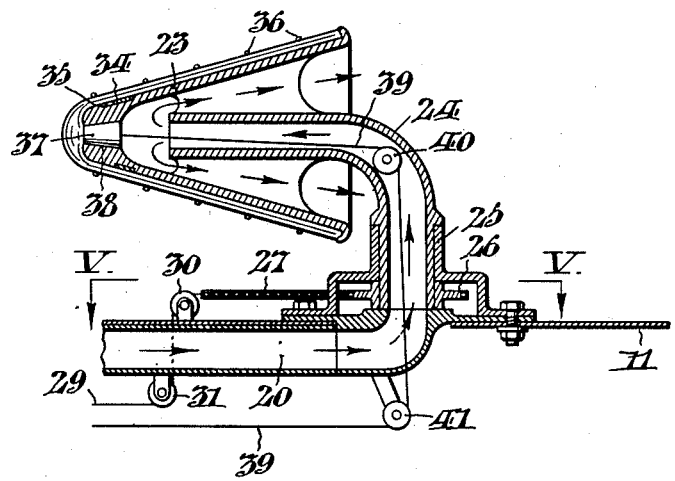
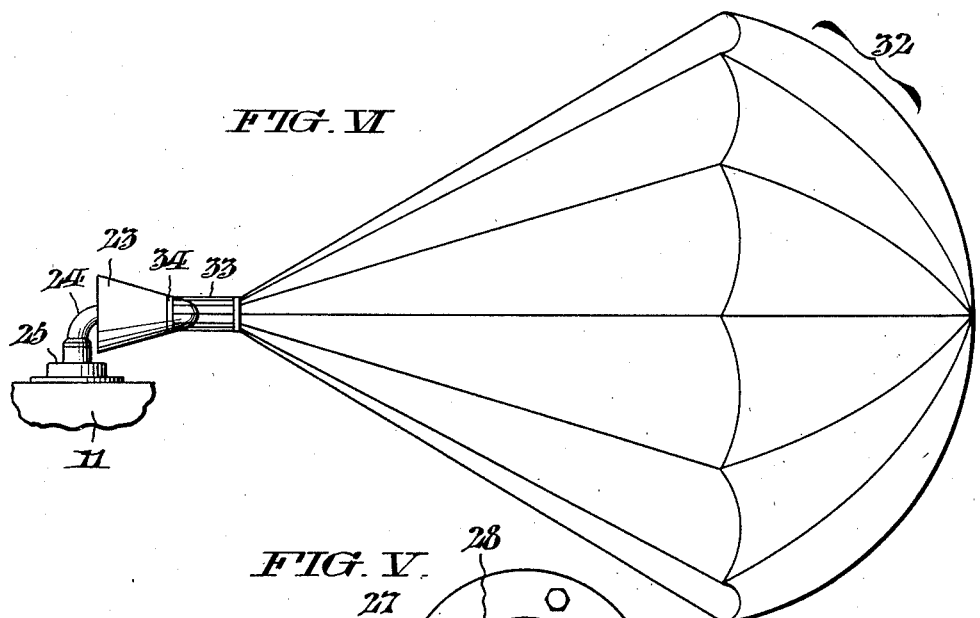
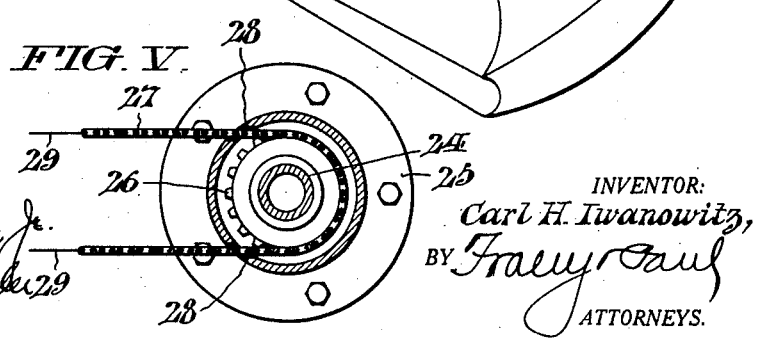
INVENTOR:
Carl H. Iwanowitz, Patented Dec. 23, 1930

1,785,775

UNITED STATES PATENT OFFICE

CARL H. IWANOWITZ, OF SOUDERTON, PENNSYLVANIA

AIRCRAFT

Application filed March 5, 1929. Serial No. 344,119.

In the main, my invention is directed toward securing better control of aeroplanes than possible with control appurtenances heretofore designed and constructed. This desideratum I secure, as hereinafter fully explained, through provision of means whereby discharge of air collected and converted into a high velocity flow under head pressure action incident to flight of the plane, may be controlled by the aviator in such manner as to be influential in promoting and retarding flight of the craft, and even in assisting steering thereof.

In addition, I aim to enable utilization of the high velocity air flow obtained as aforesaid in releasing and opening a parachute to check the drop of the plane in emergencies—likewise under control of the aviator—from within the cabin or body of the plane.

In the attached drawings, Fig. I is a top plan view of an aeroplane conveniently embodying my improvements.

Fig. II is a side elevation of the plane as viewed from the bottom of Fig. I.

Fig. III is a forward edge elevation of the plane wing showing the novel provisions made for induction of air incident to flight of the plane.

Fig. IV is a detail section on a larger scale, taken as indicated by the arrows IV—IV in Fig. I, showing the means for controlling directional discharge of the induced high velocity air flow.

Fig. V is a plan sectional view, taken as indicated by the arrows V—V in Fig. IV; and, Fig. VI is a detail view showing how the parachute is released and opened.

The aeroplane chosen for convenience of illustration herein is of the single or "monoplane" type, with its wing 10 disposed, after common practice, crosswise over the forward end of the body or cabin 11 immediately behind the motor 12 which drives the propeller 13. In adapting such a plane to the purposes of my invention, I equip it with an air inductor means 15. This inductor means 15 is shown, in the present instance, as built into the wing 10 and comprising a longitudinally-extending rearwardly-convergent medial tube 16, and two groups of serially arranged smaller tubes 17 symmetrically disposed with respect to the medial tube; all of said tubes being open along the forward edge of the plane wing 10 as shown in Fig. III. From Fig. I it will be noted that the tubes 17 are comprehended within attenuating or fan like manifolds 18, 18 from which the trapped air is conducted rearwardly through convergent trunks 19, 19, said trunks and the medial tube 16 merging into a single delivery conduit 20 of smaller diameter within the back portion of the body or cabin 11. With this arrangement it will be apparent that air is continuously gathered in during flight of the plane, and that its velocity is materially increased under head pressure action as a consequence of being obliged to traverse the various attenuated passages 16, 17 and 18 embodied in the inductor 15.

To control directional discharge of the high velocity air flow obtained as just explained, I mount on the aft portion of the plane body 11 somewhat in advance of the rudder 21 and the elevators 22, a hollow discharge head 23. As shown, this head 23 is of flaring or conical configuration, and positioned so as to direct the air horizontally, after the manner indicated by the arrows in Fig. IV. The high velocity air flow is conducted axially into the head 23 by way of a supporting elbow fitting 24, the latter being in direct communication with the delivery conduit 20. The elbow fitting 24 is mounted for rotation in a vertical swivel bearing bracket 25 secured to the roof of the body or cabin 11, said bracket affording at its bottom a hollow to enclose a sprocket wheel 26 on the lower end of the fitting 24. A chain 27, trained about the sprocket 26, has its ends passing through openings 28 (Fig. V) in the bearing bracket 25 and is connected at the exterior to cables or cords 29 which are directed downward into, and thence forward within the body 11 over pulleys 30, 31 for coordination with suitable control instrumentalities (not shown) convenient of manipulation by the aviator. With the discharge head 23 in the normal position illustrated, the high velocity air is released rearwardly in the line of travel, thereby promoting the flight of the plane. To check or retard the flight of the plane as in landing, the head 23 is simply turned through an angle of 180°—so as to discharge forwardly. In intermediate angular positions of the head 23, the high velocity air discharge will obviously be influential in guiding the flight of the plane, the organization serving under this condition in the capacity of an auxiliary steering gear.

The head 23 is also intended to be employed as a mounting for a safety parachute such as shown at 32 in Fig. VI, the trailing cords 33 of the latter being secured to an anchorage strap 34 engaging a recess 35 near the nose end of said head. The parachute 32 may be folded and wrapped on the head 23 in any suitable manner, as conventionally shown in Fig. IV, so as to overlie the nose end, and held against displacement normally by a cord 36. In order that the high velocity air may be further utilized to displace the parachute 32 from the head 23 and to concurrently open it, I provide said head at the nose end with a plug valve 37 normally closing an axial orifice 38. To the valve 37 is secured a pull cord 39 that runs over a pulley 40 within the elbow fitting 24, thence down into the body or cabin 11 where it rounds another pulley 41, the latter directing it forward to a point within easy reach of the aviator. By rotating the discharge head 23 so as to point rearward and drawing upon the plug valve cord 36, the high velocity air flow, it will be seen, is released through the orifice 38, and, as a consequence, operates to displace the parachute 32 from the head 23 and at the same time to open it, after the manner shown in Fig. VI. When thus released and opened, the parachute 32 will obviously function to check the drop of the plane, in case it gets beyond control through engine stoppage or damage, thereby affording the aviator a better opportunity to jump and save himself in such emergencies.

Having thus described my invention, I claim:

1. In an aeroplane, inductor means open along the forward edge of the plane wing to gather in air incident to flight, said means embodying a rearward conduit affording a constricted passage through which the collected air is forced and its velocity increased under head pressure action; a revolvable discharge head receiving the high velocity flow of the air obtained as aforesaid; and means whereby the head may be rotated to control directional discharge of the air flow for the purpose of assisting and retarding flight, and steering the plane.

2. In an aeroplane, inductor means comprising a system of tubes open at the forward edge of the wing plane to gather in air incident to plane flight and a rearward conduit mergent with the tubes and affording a constricted passage through which the collected air is forced and its velocity increased under head pressure action; and means aft of the plane whereby the high velocity air delivered through the tube may be utilized, through control of directional discharge, to assist and retard flight, and to steer the plane.

3. In an aeroplane, inductor means embodied in the sustaining wing operative under head pressure action incident to flight, to gather in air and at the same time increase its velocity; a mounting for a parachute; and means controllable from the cabin of the craft for releasing the high velocity air flow obtained as aforesaid for the purpose of dislodging the parachute from its mounting and opening it to check drop of the plane in emergencies.

4. In aircraft, inductor means operable, under head pressure action incidental to flight, to gather in air and at the same time increase its velocity; means whereby the high velocity air flow may be ordinarily utilized, through control of directional discharge, to assist and retard flight, and to steer the craft, said means comprising a hollow conical discharge head rotatable about a vertical axis from within the control cabin of the craft for the purposes aforementioned; an attached parachute wrapped about the head; and valve means capable of actuation from the control cabin whereby the high velocity air flow may be released in emergencies through a normally closed axial orifice in the head to effect dislodgement and opening of the parachute.

5. In aircraft, tubulose inductor means embodied in and open along the frontal edge of a wing plane operative, under head pressure incident to flight, to gather in air and at the same time to increase its velocity; and means whereby the high velocity air flowing though said tubulose means is utilized, by control of directional discharge, to assist flight of the craft.

6. In aircraft, tubulose inductor means embodied in and open along the frontal edge of a wing plane operative, under head pressure incident to flight, to gather in air and at the same time to increase its velocity; and means whereby the high velocity air flowing through said tubulose means is utilized, by control of directional discharge, to retard flight of the craft.

7. In aircraft, tubulose inductor means embodied in and open along the frontal edge of a wing plane operative, under head pressure incident to flight, to gather in air and at the same time to increase its velocity; and rotatable means whereby the high velocity air flowing through said tubulose means may be utilized, by varying its directional discharge, to steer the craft.

8. In aircraft, tubulose inductor means embodied in and open along the frontal edge of a wing plane operative, under head pressure incident to flight, to gather in air and at the same time to increase its velocity; and rotatable means whereby the high velocity air flowing through said tubulose means may be utilized, by changing its directional discharge, to assist and retard flight as well as to steer the craft.

9. In aircraft wing planes, inductor means comprising a system of tubes embodied in and open along the frontal edge of such planes operative, under head pressure action incident to flight, to gather in air and at the same time to increase its velocity; and revolvable means whereby the high velocity air flow through such inductor means may be utilized, by control of directional discharge, to assist and retard flight, to steer the craft, and to open a parachute, associated with the revolvable means, ready for immediate use in emergencies.

10. In aircraft wing planes, inductor means comprising a system of tubes embodied in and open along the frontal edge of such planes operative, under head pressure action incident to flight to gather in air forward of the planes and to increase its velocity during conduction rearward through said inductor means; and revolvable means aft of the craft whereby the high velocity flow of air thus obtained may be utilized, by control of its directional discharge, to assist and retard flight as well as to steer the craft.

11. In an aeroplane, inductor means comprising a central tube with flanking groups of other tubes embodied in and open along the frontal edge of the plane wing operative, under head pressure action incident to flight, to gather in air and at the same time to increase its velocity; and revolvable means whereby the high velocity air flow thus obtained may be utilized, by control of its directional discharge, to assist and retard flight as well as to steer the plane.

12. In an aeroplane, inductor means comprising a tapering central tube with symmetrically arranged flanking differential-tubes all open along the frontal edge of the plane wing operative, under head pressure action incident to flight, to gather in air along the forward edge of the plane wing and to increase its velocity during rearward conduction by way of the inductor means; and revolvable means aft of the plane whereby the high velocity air flow thus obtained may be utilized, by control of its directional discharge, to assist and retard flight as well as to steer the plane.

13. In an aeroplane, inductor means comprising a medial tapering tube with co-ordinate symmetrically-arranged flanking-groups of serially-arranged small tubes all embodied in and open along the frontal edge of the plane wing operative, under head pressure action incident to flight, to gather in air forward of the plane and increase its velocity through constriction during rearward conduction; and revolvable means aft of the plane whereby the high velocity air flow thus obtained may be utilized, by control of its directional discharge, to assist and retard flight as well as to steer the plane.

In testimony whereof, I have hereunto signed my name at Philadelphia, Pennsylvania, this 23rd day of February, 1929.

CARL H. IWANOWITZ.